R. D. KING.
BAGGAGE TRUCK.
APPLICATION FILED FEB. 17, 1917.
1,236,847.
Patented Aug. 14, 1917.
2 SHEETS—SHEET 1.
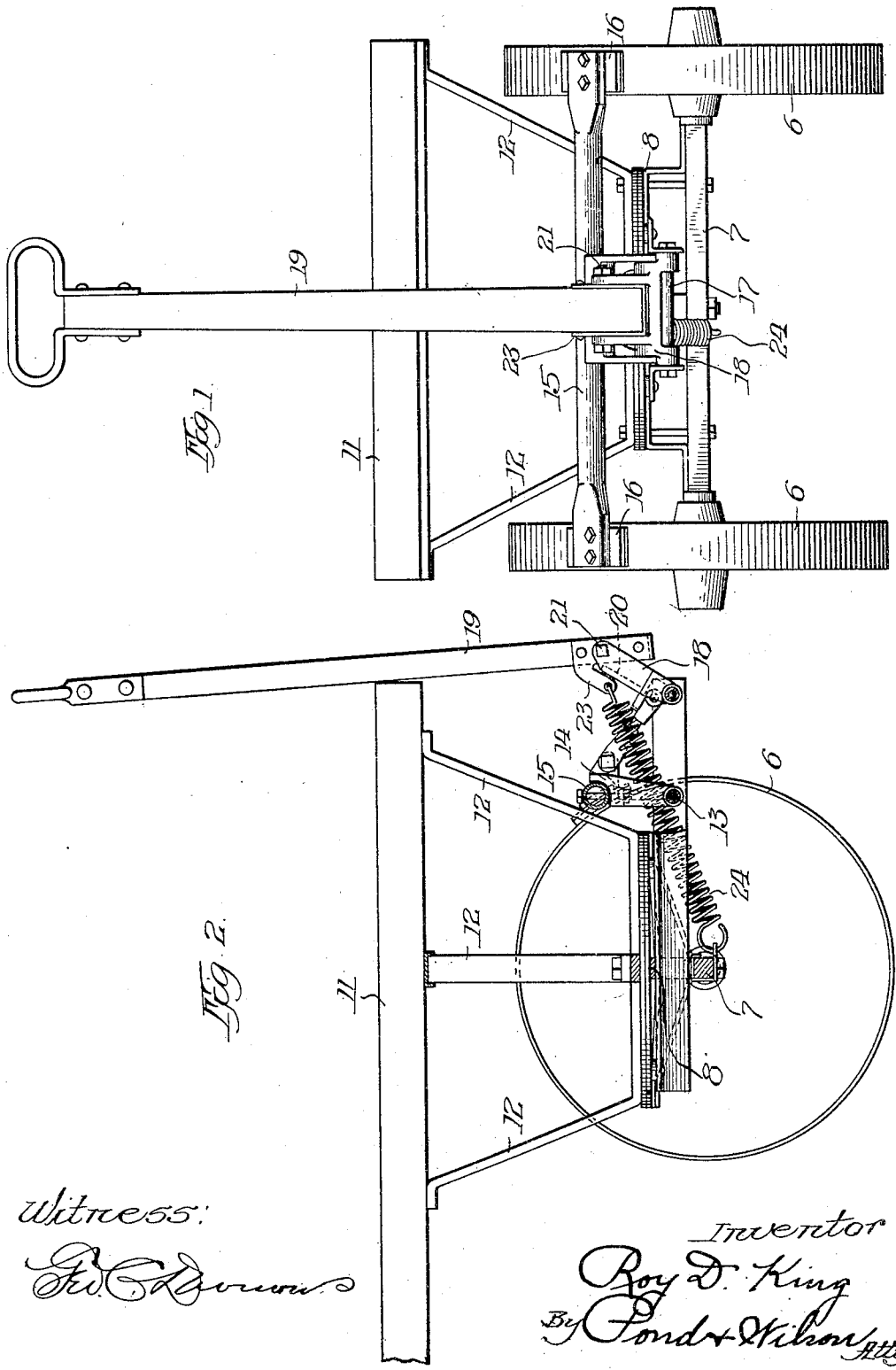

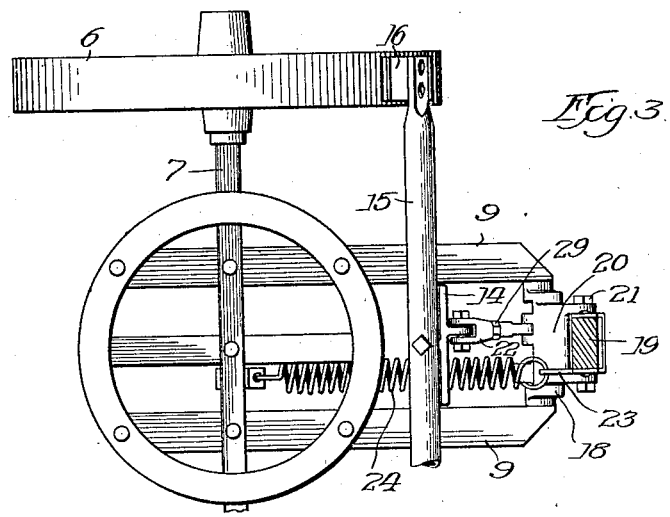
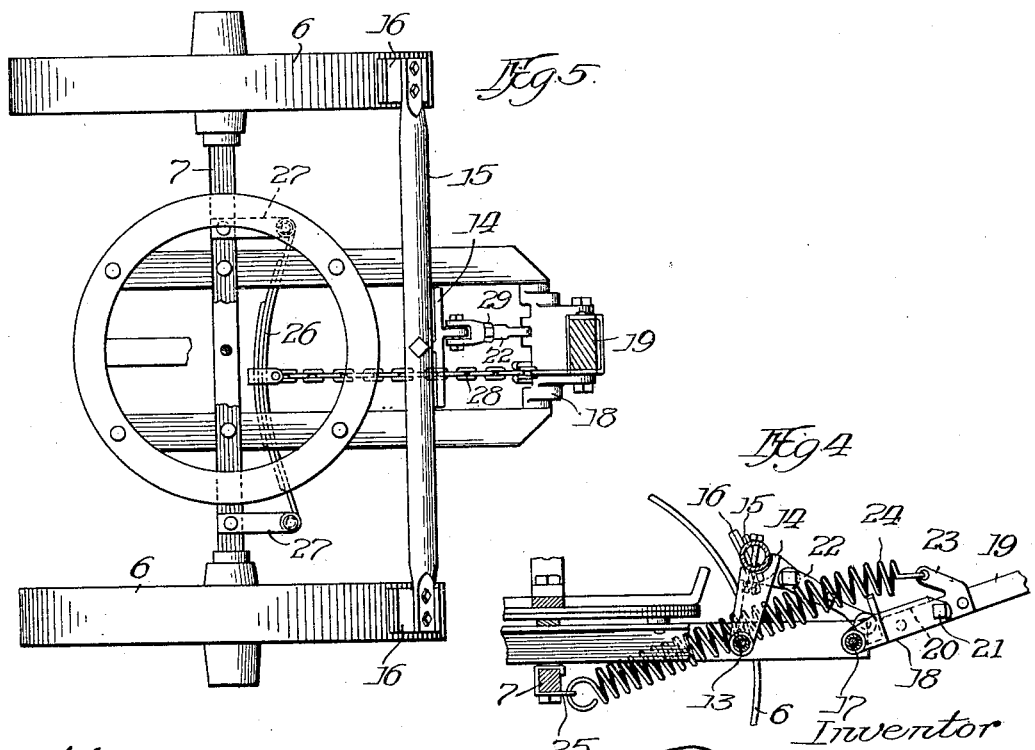

UNITED STATES PATENT OFFICE.

ROY D. KING, OF CHICAGO, ILLINOIS, ASSIGNOR TO AMERICAN SALES COMPANY, OF MONROE, LOUISIANA, A CORPORATION OF LOUISIANA.

BAGGAGE-TRUCK.

1,236,847.  Specification of Letters Patent.  Patented Aug. 14, 1917.

Application filed February 17, 1917. Serial No. 149,173.

*To all whom it may concern:*

Be it known that I, ROY D. KING, a citizen of the United States, residing at Chicago, county of Cook, and State of Illinois, have invented certain new and useful Improvements in Baggage-Trucks, of which the following is a specification.

This invention relates in general to trucks, and has more particular reference to baggage trucks such as are customarily used around railway stations for transporting baggage, express packages and the like, to and from the railway cars.

These trucks are usually left standing outside on the station platform and frequently they are moved along and sometimes run off of the platform onto the railway tracks by high winds. Furthermore, the handles by which the trucks are moved about project forwardly from the trucks in such a position that accidents have many times resulted from people running into or stumbling over these handles.

One of the primary objects of my present invention is to provide a truck which as soon as the handle is released will automatically elevate the handle into vertical position, where it will be out of the way and will simultaneously apply the brake to the wheels to lock the wheels against rotation, so that the truck cannot be accidentally moved when it has been left standing. My improved truck is also designed so that when the handle is lowered or swung downwardly into operative position by the baggageman this movement will automatically release the brake so that the truck can be readily moved about.

Another object of my invention is to provide a truck of this character in which the handle and brake-controlling mechanism will be simple in construction, cheap to manufacture, and strong and durable in service.

Many other attendant advantages of my invention will be readily appreciated as the same becomes better understood by reference to the following description when considered in connection with the accompanying drawings. Referring to the drawings—

Figure 1 is a front elevation of a truck equipped with my invention;

Fig. 2 is a longitudinal sectional view through the truck shown in Fig. 1;

Fig. 3 is a fragmentary plan view of the construction shown in Figs. 1 and 2, the truck platform being omitted to show the underlying parts;

Fig. 4 is a fragmentary view similar to Fig. 2 but showing the handle in down position; and Fig. 5 is a plan view similar to Fig. 3, showing a modified form of my invention.

By reference to the drawing it will be observed that the truck in which my invention is embodied comprises the usual front wheels 6 mounted upon the axle 7 which carries the fifth wheel 8 and the hounds 9. The platform 11 upon which the baggage is piled is carried by supporting elements 12 at a sufficient height to permit the wheels to turn entirely beneath the platform. The rear portion of the platform and the rear wheels of the truck, which are not shown on the drawings, may be of usual construction.

Between the forwardly projecting hounds 9 I have pivotally mounted upon pivot bolts 13 a yoked bracket or support 14 which carries at its upper end a transversely extending beam 15 equipped at its outer ends with brake shoes 16 adapted to engage the wheels 6.

Near the outer ends of the hounds I have pivotally mounted upon a pivot bolt 17 a handle support 18, shaped to accommodate the lower end of the handle proper 19, which is pivotally mounted on the support 18 by a bolt 21. It will be manifest that the handle support can swing upon its pivot bolt 17 while the handle can swing with respect to the support upon its pivot bolt 21, the swinging movement of the handle in a downward direction being limited by engagement of the end of the handle below the pivot 21 with the top wall 20 of the support 18. A link 22 attached at one end to the brake beam support 14 and at its other end to the handle support 18, forms a connection between these supports which causes them to swing together about their pivots so that when the handle support is moved into the position shown in Figs. 1 and 2 the brake shoes 16 are forced into engagement with the wheels, and when the support 18 is in lowered position, as shown in Fig. 4, the brake shoes are withdrawn from the wheels.

Forwardly of the pivot bolt 21 the handle 19 is provided with an ear 23 to which one end of a strong contractile spring 24 is attached, the other end of this spring being connected with a stationary part of the truck such, for instance, as the axle 7, which may be provided with an eye 25 to which the spring is directly connected. This spring is sufficiently strong to swing the handle upon its pivot bolt 21 from the position shown in Fig. 4 to the vertical position shown in Figs. 1 and 2, and also to swing the handle support 18 upwardly about its pivot so as to apply the brake. Whenever the handle is released the spring will immediately swing it into vertical position out of the way of passersby, and at the same time the brakes will be applied to the wheels so that the truck cannot be accidentally moved. Whenever it is desired to use the truck the handle is grasped and swung downwardly by the user, thereby automatically releasing the brakes. It should be noted that because of the longer leverage afforded by the handle but little force is required to swing the handle downwardly against the action of the spring, and also, that because of the leverage afforded by reason of the connection of the link 22 to the brake beam support and the handle support at different distances from their respective pivots, the brakes are applied with considerable force whenever the handle is released.

Instead of employing a coiled contractile spring, as shown in Figs. 1 to 4 inclusive, I may in some instances utilize a leaf spring 26, as shown in Fig. 5. In this instance the spring is carried by suitable brackets 27 mounted upon the front axle, and a chain 28 is employed to connect the spring with the ear 23 on the handle. The operation of this form of my invention is substantially the same as that previously described but all danger of accident which might result from the breaking of a large contractile spring, such as 24, is eliminated.

In order that the brakes may be accurately set, so that they will be applied with the requisite force, the link 22 consists of two pieces which are longitudinally adjustable by means of an adjusting nut 29. By adjusting the length of this link the degree of pressure which will be exerted by the brake upon the wheels whenever the handle is released may be regulated to a fine degree of nicety.

It is believed that my invention and its mode of operation will be readily understood from the foregoing without further description, and it should be obvious that I have provided a truck which when in use will operate in the usual manner, but when left standing will automatically elevate the handle to a vertical position, out of the way of passersby, and will simultaneously apply a brake to the wheels to prevent accidental movement of the truck. It should also be understood that the particular embodiments of my invention illustrated and described have been selected for purposes of illustration merely and that my invention is capable of embodiment in materially different forms without departing from the essence of the invention as defined in the following claims:

I claim:

1. In a baggage truck, the combination of a wheel, a brake therefor, a movable support, a handle pivoted on said support, means for urging said handle into vertical position and simultaneously moving said support, and means whereby movement of said support is transmitted to said brake.

2. In a baggage truck, the combination of supporting wheels, a brake therefor, a pivotally mounted handle support, a handle pivotally mounted on said support, means for swinging said handle and said support upwardly on their respective pivots, and means operated by movement of said support for applying said brake.

3. In a baggage truck, the combination of supporting wheels, a brake therefor, a pivotally mounted handle support, a handle pivotally mounted on said support, means connected with said handle for swinging said handle into vertical position, and a connection between said handle support and said brake whereby the brake is applied when said handle is swung into vertical position.

4. In a baggage truck, the combination of supporting wheels, a brake therefor, a pivotally mounted handle support, a handle mounted on said support, a spring for normally moving said handle into vertical position, and a link connecting said brake with said handle support whereby the brake is applied upon movement of said handle into vertical position.

5. In a baggage truck, the combination of supporting wheels, a brake therefor, a pivotally mounted handle support, a link connecting said support with said brake, a handle pivotally mounted on said support, means for limiting the swinging movement of said handle with respect to said support in one direction, and a spring connected with said handle whereby said handle and support are swung about their respective pivots to dispose the handle in vertical position and simultaneously apply said brake.

6. In a baggage truck, the combination of supporting wheels, a pivotally mounted brake beam provided with brake shoes adapted to engage said wheels, a pivotally mounted handle support connected with said brake beam so that said beam and support will move together, a handle pivotally mounted on said support, means for limiting the swinging movement in one direction with respect to said support, and a spring connected with said handle and with a fixed part of said truck whereby upon release of the handle said handle is swung into vertical position and said support is simultaneously swung on its pivot to apply the brake shoes to said wheels.

ROY D. KING.

Copies of this patent may be obtained for five cents each, by addressing the "Commissioner of Patents, Washington, D. C."